United States Patent
Okumura et al.

(10) Patent No.: US 9,499,675 B2
(45) Date of Patent: Nov. 22, 2016

(54) METHOD FOR PRODUCING RESIN FOAM, AND RESIN FOAM

(71) Applicant: INOAC CORPORATION, Nagoya-shi, Aichi (JP)

(72) Inventors: Naoya Okumura, Hadano (JP); Yasuhiro Usami, Hadano (JP); Shigeyasu Shimura, Hadano (JP)

(73) Assignee: INOAC CORPORATION, Nagoya-shi (JP)

( * ) Notice: Subject to any disclaimer, the term of this patent is extended or adjusted under 35 U.S.C. 154(b) by 0 days.

(21) Appl. No.: 14/523,263

(22) Filed: Oct. 24, 2014

(65) Prior Publication Data

US 2015/0045464 A1    Feb. 12, 2015

Related U.S. Application Data

(63) Continuation of application No. PCT/JP2013/061659, filed on Apr. 19, 2013.

(30) Foreign Application Priority Data

Apr. 27, 2012   (JP) .................. 2012-104104

(51) Int. Cl.
| | |
|---|---|
| *C08J 9/00* | (2006.01) |
| *C08J 9/30* | (2006.01) |
| *C08J 9/40* | (2006.01) |
| *B29C 47/08* | (2006.01) |
| *C08J 9/12* | (2006.01) |
| *B29C 47/00* | (2006.01) |
| *B29C 44/30* | (2006.01) |
| *B29C 44/34* | (2006.01) |
| *B29C 44/56* | (2006.01) |
| *B29C 47/92* | (2006.01) |
| *B29K 23/00* | (2006.01) |
| *B29K 105/04* | (2006.01) |

(52) U.S. Cl.
CPC .................. *C08J 9/30* (2013.01); *B29C 44/30* (2013.01); *B29C 44/3403* (2013.01); *B29C 44/348* (2013.01); *B29C 44/5636* (2013.01); *B29C 47/0019* (2013.01); *B29C 47/0057* (2013.01); *B29C 47/08* (2013.01); *C08J 9/0061* (2013.01); *C08J 9/122* (2013.01); *B29C 47/004* (2013.01); *B29C 47/92* (2013.01); *B29C 2947/92514* (2013.01); *B29C 2947/92704* (2013.01); *B29K 2023/0633* (2013.01); *B29K 2023/12* (2013.01); *B29K 2023/16* (2013.01); *B29K 2105/04* (2013.01); *B29K 2105/041* (2013.01); *C08J 2203/06* (2013.01); *C08J 2203/08* (2013.01); *C08J 2323/02* (2013.01); *C08J 2323/06* (2013.01); *C08J 2323/12* (2013.01); *C08J 2400/22* (2013.01); *C08J 2447/00* (2013.01)

(58) Field of Classification Search
None
See application file for complete search history.

(56) References Cited

U.S. PATENT DOCUMENTS

| | | | |
|---|---|---|---|
| 5,977,197 A | 11/1999 | Malone | |
| 6,008,262 A * | 12/1999 | McKay | .................. C08J 9/122 521/134 |
| 6,462,101 B1 * | 10/2002 | Ramesh | ................. C08J 9/0061 521/134 |
| 2002/0177659 A1 * | 11/2002 | Morikawa | ............. C08J 9/0061 525/88 |
| 2005/0153634 A1 | 7/2005 | Prasad et al. | |
| 2005/0276967 A1 | 12/2005 | Prasad | |
| 2006/0177642 A1 | 8/2006 | Tateo et al. | |
| 2007/0031622 A1 * | 2/2007 | Imanari | ................... B29C 44/08 428/36.5 |
| 2008/0057301 A1 | 3/2008 | Tateo et al. | |
| 2009/0209670 A1 | 8/2009 | Kanae et al. | |
| 2010/0016458 A1 | 1/2010 | Saitou et al. | |
| 2010/0239836 A1 | 9/2010 | Kato et al. | |
| 2011/0262744 A1 | 10/2011 | Hatanaka et al. | |
| 2012/0199279 A1 | 8/2012 | Lee et al. | |
| 2013/0079430 A1 | 3/2013 | Jintoku et al. | |
| 2013/0235514 A1 | 9/2013 | Tateo et al. | |
| 2014/0242371 A1 | 8/2014 | Hatanaka et al. | |

FOREIGN PATENT DOCUMENTS

| | | |
|---|---|---|
| CN | 1362978 A | 8/2002 |
| CN | 101282818 A | 10/2008 |
| CN | 101838472 A | 9/2010 |
| EP | 1 449 868 A1 | 8/2004 |
| JP | 10-259267 A | 9/1998 |
| JP | 2001-348452 A | 12/2001 |
| JP | 2003-209078 A | 7/2003 |
| JP | 2004-300176 A | 10/2004 |
| JP | 2008-274155 A | 11/2008 |
| JP | 4578407 B2 | 11/2010 |

(Continued)

OTHER PUBLICATIONS

International Search Report dated Jul. 16, 2013, issued in corresponding application No. PCT/JP2013/061659.

(Continued)

*Primary Examiner* — Kara Boyle
(74) *Attorney, Agent, or Firm* — Westerman, Hattori, Daniels & Adrian, LLP (57) ABSTRACT

A method for producing resin foam including: melting a resin composition including a polyolefin resin and a thermoplastic elastomer; impregnating the molten resin composition with a material that is a gas at normal temperature and normal pressure, in a supercritical state, under a condition in which the supercritical state of the material is maintained; foaming the resin composition impregnated with the material by arranging the resin composition under a condition in which the supercritical state of the material is not maintained; and hot-pressing the foamed resin composition.

20 Claims, 4 Drawing Sheets

(56) References Cited

FOREIGN PATENT DOCUMENTS

| JP | 2011-231171 A | 11/2011 |
| JP | 2013-028654 A | 2/2013 |
| JP | 2013-049830 A | 3/2013 |
| WO | 2007/024464 A1 | 3/2007 |
| WO | 2007/119625 A1 | 10/2007 |
| WO | 2008/041617 A1 | 4/2008 |
| WO | 2013/054620 A1 | 4/2013 |

OTHER PUBLICATIONS

International Preliminary Report on Patentability (Form PCT/IB/373) of International Application No. PCT/JP2013/061659 dated Oct. 28, 2014, with Form PCT/ISA/237.

Office Action dated Oct. 6, 2015, issued in counterpart Japanese Patent Application No. 2014-512529, with Partial English translation. (5 pages).

Extended Search Report dated Nov. 25, 2015, issued in counterpart European Patent Application No. 13781266.5. (8 pages).

Office Action dated Mar. 1, 2016, issued in counterpart Chinese Patent Application No. 201380022271.0, with Partial English translation. (12 pages).

Office Action dated Apr. 26, 2016, issued counterpart Japanese Patent Application No. 2014-512529, with Partial English translation. (5 pages).

Partial translation of "Submitted Document for Publications" described in the Japanese Office Action dated Apr. 26, 2016, issued in counterpart Japanese Patent Application No. 2014-512529. (16 pages).

* cited by examiner

Table 1

|  | Comparative Example 1 | Comparative Example 2 | Comparative Example 3 | Example 1 | Example 2 | Example 3 | Example 4 | Example 5 | Example 6 |
|---|---|---|---|---|---|---|---|---|---|
| Olefin Resins | 100 | 100 | 100 | 100 | 100 | 100 | 100 | 100 | 100 |
| Thermoplastic Elastomer (Amorphous Elastomer) | Foam having a thickness of 0.1 mm produced according to the method described in Patent Literature 1 (XLIM 0.1 mm, Sekisui Chemical Co., Ltd.) | Foam having a thickness of 0.3 mm produced according to the method described in Patent Literature 1 (XLIM 0.3 mm, Sekisui Chemical Co., Ltd.) | 0 | 5 | 10.3 | 15.1 | 21.3 | 25.4 | 34.9 |
| Crystalline Elastomer |  |  |  |  |  |  |  |  |  |
| Wet Silica |  |  | 3.6 | 4.1 | 4.4 | 4.6 | 5.0 | 5.2 | 5.7 |
| Foamed/Does Not Foam |  |  | Does not foam | Foams | Foams | Foams | Foams | Foams | Foams |
| Density of foam with skin still attached (kg/m3) |  |  |  | 57 | 55 | 57 | 54 | 58 | 70 |
| Density of foam following removal of skin (kg/m3) | 300 | 200 |  | 41 | 40 | 44 | 44 | 43 | 52 |

*Olefin resin refers to the total amount of an olefin resin including polypropylene, high melt tension polypropylene and polyethylene (including carrier resin of pigment master batch)

● Compression Step

|  |  | Comparative Example 1 | Comparative Example 2 | Comparative Example 3 | Example 1 | Example 2 | Example 3 | Example 4 | Example 5 | Example 6 |
|---|---|---|---|---|---|---|---|---|---|---|
| Before pressing | No. of cells per 1 mm square of cross-section in TD direction |  |  |  | 140 | 154 | 179 | 267 | 271 | 401 |
| After pressing | No. of cells in 100μm square at compression rate of 90%  1.0 ⇒ 0.1 mm | Calculation of no. of cells in 100μm square of 0.1 mm thick sheet 3 | Calculation of no. of cells in 100μm square of 0.3 mm thick sheet 1 |  | 30 | 31 | 35 | 53 | 54 | 60 |
|  | No. of cells in 100μm square at compression rate of 70%  1.0 ⇒ 0.3 mm |  |  |  | 24 | 25 | 30 | 49 | 47 | 59 |
|  | No. of cells in 100μm square at compression rate of 83%  0.6 ⇒ 0.1 mm |  |  |  | 23 | 25 | 34 | 44 | 45 | 63 |
|  | No. of cells in 100μm square at compression rate of 67%  0.6 ⇒ 0.2 mm |  |  |  | 20 | 21 | 27 | 35 | 35 | 50 |

● Evaluation

|  |  |  | Comparative Example 1 | Comparative Example 2 | Comparative Example 3 | Example 1 | Example 2 | Example 3 | Example 4 | Example 5 | Example 6 |
|---|---|---|---|---|---|---|---|---|---|---|---|
| Water Resistance | Seal Width 1.0mm | Compression 1.0 ⇒ 0.1 mm | Absence of water leakage in 0.1 mm test piece | Absence of water leakage in 0.3 mm test piece |  | Absence of water leakage | Absence of water leakage | Absence of water leakage | Absence of water leakage | Absence of water leakage | Absence of water leakage |
|  |  | Compression 1.0 ⇒ 0.3 mm |  |  |  | Absence of water leakage | Absence of water leakage | Absence of water leakage | Absence of water leakage | Absence of water leakage | Absence of water leakage |
|  |  | Compression 0.6 ⇒ 0.1 mm |  |  |  | Absence of water leakage | Absence of water leakage | Absence of water leakage | Absence of water leakage | Absence of water leakage | Absence of water leakage |
|  |  | Compression 0.6 ⇒ 0.2 mm |  |  |  | Absence of water leakage | Absence of water leakage | Absence of water leakage | Absence of water leakage | Absence of water leakage | Absence of water leakage |
|  | Seal Width 0.75mm | Compression 1.0 ⇒ 0.1 mm | Presence of water leakage in 0.1 mm test piece | Presence of water leakage in 0.3 mm test piece |  | Absence of water leakage | Absence of water leakage | Absence of water leakage | Absence of water leakage | Absence of water leakage | Absence of water leakage |
|  |  | Compression 0.6 ⇒ 0.1 mm |  |  |  | Absence of water leakage | Absence of water leakage | Absence of water leakage | Absence of water leakage | Absence of water leakage | Absence of water leakage |
|  |  | Compression 0.6 ⇒ 0.2 mm |  |  |  | Absence of water leakage | Absence of water leakage | Absence of water leakage | Absence of water leakage | Absence of water leakage | Absence of water leakage |
| Dust Resistance | Seal Width 1.0mm | Compression 1.0 ⇒ 0.1 mm | Absence of dust contamination in 0.1 mm test piece | Absence of dust contamination in 0.3 mm test piece |  | Absence of dust contamination | Absence of dust contamination | Absence of dust contamination | Absence of dust contamination | Absence of dust contamination | Absence of dust contamination |
|  |  | Compression 1.0 ⇒ 0.3 mm |  |  |  | Absence of dust contamination | Absence of dust contamination | Absence of dust contamination | Absence of dust contamination | Absence of dust contamination | Absence of dust contamination |
|  |  | Compression 0.6 ⇒ 0.1 mm |  |  |  | Absence of dust contamination | Absence of dust contamination | Absence of dust contamination | Absence of dust contamination | Absence of dust contamination | Absence of dust contamination |
|  |  | Compression 0.6 ⇒ 0.2 mm |  |  |  | Absence of dust contamination | Absence of dust contamination | Absence of dust contamination | Absence of dust contamination | Absence of dust contamination | Absence of dust contamination |
|  | Seal Width 0.75mm | Compression 1.0 ⇒ 0.1 mm | Presence of dust contamination in 0.1 mm test piece | Presence of dust contamination in 0.3 mm test piece |  | Absence of dust contamination | Absence of dust contamination | Absence of dust contamination | Absence of dust contamination | Absence of dust contamination | Absence of dust contamination |
|  |  | Compression 0.6 ⇒ 0.1 mm |  |  |  | Absence of dust contamination | Absence of dust contamination | Absence of dust contamination | Absence of dust contamination | Absence of dust contamination | Absence of dust contamination |
|  |  | Compression 0.6 ⇒ 0.2 mm |  |  |  | Absence of dust contamination | Absence of dust contamination | Absence of dust contamination | Absence of dust contamination | Absence of dust contamination | Absence of dust contamination |

FIG. 3

Table 2

| | Example 7 | Example 8 | Example 9 |
|---|---|---|---|
| Olefin Resins | 100 | 100 | 100 |
| Thermoplastic Elastomer (Amorphous Elastomer) | 29 | 37 | 50 |
| Crystalline Elastomer | - | 26 | 71 |
| Wet Silica | 4.9 | 6.1 | 8.3 |
| Foams/Does Not Foam | Foams | Foams | Foams |
| Density of foam with skin still attached (kg/m3) | 59 | 57 | 60 |
| Density of foam following removal of skin (kg/m3) | 40 | 40 | 40 |

* Olefin resin refers to the total amount of an olefin resin including polypropylene and high melt tension polypropylene (including carrier resin of pigment master batch)

● Compression Step

| | | Example 7 | Example 8 | Example 9 |
|---|---|---|---|---|
| Before pressing | No. of cells per 1 mm square of cross-section in TD direction | 300 | 369 | 320 |
| After pressing | No. of cells in 100μm square at compression rate of 90% 1.0 ⇒ 0.1 mm | 58 | 68 | 64 |
| | No. of cells in 100μm square at compression rate of 70% 1.0 ⇒ 0.3 mm | 40 | 52 | 47 |
| | No. of cells in 100μm square at compression rate of 83% 0.6 ⇒ 0.1 mm | 45 | 58 | 49 |
| | No. of cells in 100μm square at compression rate of 67% 0.6 ⇒ 0.2 mm | 36 | 45 | 38 |

● Evaluation

| | | | Example 7 | Example 8 | Example 9 |
|---|---|---|---|---|---|
| Water Resistance | Seal Width 1.0mm | Compression 1.0 ⇒ 0.1 mm | Absence of water leakage | Absence of water leakage | Absence of water leakage |
| | | Compression 1.0 ⇒ 0.3 mm | Absence of water leakage | Absence of water leakage | Absence of water leakage |
| | | Compression 0.6 ⇒ 0.1 mm | Absence of water leakage | Absence of water leakage | Absence of water leakage |
| | | Compression 0.6 ⇒ 0.2 mm | Absence of water leakage | Absence of water leakage | Absence of water leakage |
| | Seal Width 0.75mm | Compression 1.0 ⇒ 0.1 mm | Absence of water leakage | Absence of water leakage | Absence of water leakage |
| | | Compression 1.0 ⇒ 0.3 mm | Absence of water leakage | Absence of water leakage | Absence of water leakage |
| | | Compression 0.6 ⇒ 0.1 mm | Absence of water leakage | Absence of water leakage | Absence of water leakage |
| | | Compression 0.6 ⇒ 0.2 mm | Absence of water leakage | Absence of water leakage | Absence of water leakage |

| | | | Example 7 | Example 8 | Example 9 |
|---|---|---|---|---|---|
| Dust Resistance | Seal Width 1.0mm | Compression 1.0 ⇒ 0.1 mm | Absence of dust contamination | Absence of dust contamination | Absence of dust contamination |
| | | Compression 1.0 ⇒ 0.3 mm | Absence of dust contamination | Absence of dust contamination | Absence of dust contamination |
| | | Compression 0.6 ⇒ 0.1 mm | Absence of dust contamination | Absence of dust contamination | Absence of dust contamination |
| | | Compression 0.6 ⇒ 0.2 mm | Absence of dust contamination | Absence of dust contamination | Absence of dust contamination |
| | Seal Width 0.75mm | Compression 1.0 ⇒ 0.1 mm | Absence of dust contamination | Absence of dust contamination | Absence of dust contamination |
| | | Compression 1.0 ⇒ 0.3 mm | Absence of dust contamination | Absence of dust contamination | Absence of dust contamination |
| | | Compression 0.6 ⇒ 0.1 mm | Absence of dust contamination | Absence of dust contamination | Absence of dust contamination |
| | | Compression 0.6 ⇒ 0.2 mm | Absence of dust contamination | Absence of dust contamination | Absence of dust contamination |

FIG. 4

METHOD FOR PRODUCING RESIN FOAM, AND RESIN FOAM

CROSS-REFERENCE TO RELATED APPLICATION

This application is a continuation application of International Application PCT/JP2013/061659 filed on Apr. 19, 2013, claiming priority based on Japanese Patent Application No. 2012-104104, filed Apr. 27, 2012 and designated the U.S., the entire contents of which are incorporated herein by reference.

FIELD

The present invention relates to a method for producing resin foam, and resin foam.

BACKGROUND ART

Resin foam sheets have conventionally been used in a wide range of applications such as dust-proof and waterproof materials. When using these dust-proof and waterproof materials as gaskets in particular, in addition to being required to demonstrate high levels of dust resistance and water resistance in terms of basic performance, these materials are also required to demonstrate cushioning and light weight (reduction in materials used).

Under such requirements, there are dust-proof and waterproof materials such as microcellular urethane-based foam that is lowly foamed and has an closed-cell structure, foam obtained by compression-molding of highly foamed urethane, and polyolefin-based (for example, polyethylene-based) foam having closed-cells.

Among these, as a foam sheet that currently demonstrates the most favorable level of performance, a foam sheet has been proposed that has an average cell diameter in the machine direction (MD) of 110 µm to 305 µm and an average cell diameter in the transverse direction (TD) of 100 µm to 370 µm and is composed of a foam produced by going through steps including: crosslinking a foamable polyolefin sheet, foaming it thereafter, and stretching the resulting foam sheet in the MD and/or TD direction to stretch the cells in the foam sheet while maintaining a semi-molten state exhibited during foaming (Japanese Patent No. 4578407, hereafter to be referred to as Patent Literature 1).

Furthermore, MD (machine direction) refers to the direction parallel to the longitudinal direction of a foam formed into a long sheet, while TD (transverse direction) refers to the direction perpendicular to longitudinal direction of a foam formed into a long sheet.

SUMMARY

According to one aspect of the present production method, a method for producing resin foam is provided including: melting a resin composition including a polyolefin resin and a thermoplastic elastomer; impregnating the molten resin composition with a material that is a gas at normal temperature and normal pressure, in a supercritical state, under a condition in which the supercritical state of the material is maintained; foaming the resin composition impregnated with the material by arranging the resin composition under a condition in which the supercritical state of the material is not maintained; and hot-pressing the foamed resin composition.

According to one aspect of the present foam, provided is a resin foam having closed-cells that includes a polyolefin resin, a thermoplastic elastomer, and a crystalline elastomer having a degree of crystallization higher than that of the thermoplastic elastomer.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a table showing the results of evaluating low-thickness foams according to Example 7 to 9.

DESCRIPTION OF EMBODIMENTS

Although the following provides a detailed explanation of embodiments of the present invention, the technical scope of the present invention is not limited to these embodiments. The following provides explanations of the method for producing resin foam according to the present embodiment, resin foam obtained according to that production method, properties of the resin foam, and applications of the resin foam in that order.

In the fields of cell phones and smartphones using touch panels, there has recently been a demand that display area is set wider while ensuring high levels of dust resistance, water resistance and light weight. Under the demand, as a performance of dust-proof and waterproof materials, it is required to prevent the entry of dust and water from vacant space in these materials even when the thickness and width of these materials are reduced. When the inventors of the present invention tested the foam sheet according to Patent Literature 1, results were obtained that indicated that dust resistance and water resistance are not always adequate when the width of the foam sheet is reduced (for example, 0.75 mm) and it is used thereafter, although the foam sheet is able to ensure adequate dust resistance and water resistance when the width of the foam sheet is set to 1 mm and it is used thereafter. Therefore, an object of the present invention is to provide a resin foam sheet capable of ensuring high levels of dust resistance and water resistance even when the width and thickness thereof are reduced.

According to the present invention, since the average length of long diameter of the cells and the average length of short diameter of the cells are extremely small, demonstrated is the effect of being able to provide a resin foam sheet capable of ensuring high dust resistance and high water resistance even when the width and thickness thereof are reduced.

The inventors of the present invention examined those factors that cause an increase in the size of cells in the foam sheet according to Patent Literature 1. First, attention was focused on the fact that the resin foam sheet according to Patent Literature 1 is produced using a chemical foaming agent (thermo-decomposable foaming agent). Namely, nearly all chemical foaming agents have poor compatibility with molten resin and are dispersed in particulate form when kneaded with molten resin. Thus, the cells are large that are formed when the chemical foaming agent grows to bubbles, per se. Accordingly, in order to overcome this problem, a technique was employed that includes kneading a molten resin with a material that melts into the molten resin at the molecular level and is a gas at normal temperature and normal pressure, instead of a chemical foaming agent, in a supercritical state. Moreover, attention was also focused on the fact that the resin foam sheet according to Patent Literature 1 includes a step of stretching a sheet to thin it after foaming the sheet. More specifically, a technique was employed that includes maintaining or further reducing the diameter of cells by compressing a resin sheet with a hot press instead of stretching thereof, based on the fact that cell diameter ends up increasing in the direction of stretching when a resin sheet is stretched after foaming.

(Embodiment 1)

<<Method for Producing Resin Foam>>

First, the method for producing a foam resin according to the present embodiment includes a melt step of melting a resin composition including 100 parts by weight of a polyolefin resin and 5 parts by weight to 35 parts by weight of a thermoplastic elastomer, an impregnation step of impregnating the molten resin composition with a material that is a gas at normal temperature and normal pressure, in a supercritical state, under conditions in which the supercritical state of the material is maintained, a foaming step of foaming the resin composition impregnated with the material by arranging the resin composition under conditions in which the supercritical state of the material, that is a gas at normal temperature and normal pressure, is not maintained, and a compression step of hot-pressing the foamed resin composition to obtain the resin. Here, the resin composition is preferably a non-crosslinked, thermoplastic resin composition so that the resin composition can be kneaded and extruded when the material that is a gas at normal temperature and normal pressure is in a supercritical state and so that cells can be uniformly shrunk during the hot-pressing in order to prevent distortion of the cells. The following provides an explanation of raw materials, incorporated amounts and the process used in that order.

<Raw Materials>

(Polyolefin Resin)

There are no particular limitations on the thermoplastic polyolefin resin according to the present embodiment, and it may be a homopolymer or a copolymer (random or block) of olefins, or it may be one of them or a combination of two or more of them. Examples of polyolefin include one type of polyethylene, polypropylene, polybutene-1, ethylene-propylene copolymer, ethylene-α-olefin copolymer, polymethylpentene, cyclic olefin resins and polyolefins obtained by introducing a polar group therein (such as ethylene vinyl acetate) or a combination of two or more types of them. Among these, mixtures of polyethylene and polypropylene are preferable (the weight ratio is preferably such that PE:PP=1:1.5 to 1:2.5).

Polyethylene may be any of high-density polyethylene, medium-density polyethylene, linear low-density polyethylene or low-density polyethylene.

Propylene may be any of atactic, isotactic or syndiotactic polypropylene when classified according to crystal structure, or any of homo-, block or random polypropylene when classified according to type. In addition, the polypropylene is preferably a polypropylene having high elongational viscosity considered suitable for foaming, such as polypropylene having long-chain branched chains present in the main chain backbone (HMS-PP) or polypropylene including high molecular weight components and having a broad molecular weight distribution.

Furthermore, polyolefin resins classified as elastomers are included in thermoplastic elastomer resins to be subsequently described but are not included in the "polyolefin resins" of Embodiments 1 to 3. For example, although ethylene-propylene copolymer (EPR), which is a rubbery elastic body, is one of ethylene-α-olefin copolymers, EPR is included in the "thermoplastic elastomers" to be subsequently described but is not included in the polyolefin resins according to Embodiments 1 to 3. Ethylene-octene copolymer (EOM) is also included in the "thermoplastic elastomers" to be subsequently described but is not included in the polyolefin resins according to Embodiments 1 to 3.

Similarly, a block copolymer of ethylene-octene copolymer (EOM) and polyethylene is included in the "crystalline elastomer" of Embodiment 3, and it is not included in the polyolefin resins according to Embodiments 1 to 3. Moreover, a block copolymer of ethylene-octene copolymer (EOM) and polypropylene is included in the "crystalline elastomer" of Embodiment 3, and it is not included in polyolefin resins of Embodiments 1 to 3.

Among these, random polypropylene is preferable since it is able to impart heat resistance to the resulting foam and maintain flexibility of the resulting foam. In particular, although both of a copolymer to which 5% by weight or less of ethylene is added and a copolymer to which butene-1 is added may be used, the copolymer with ethylene is preferable in terms of obtaining flexibility.

In addition, when considering in terms of physical properties, a polyolefin resin that is free of the escape of gas and is easily foamed is preferable, and from the viewpoints thereof, the melt flow rate (in accordance with JIS-K7210) of the principal polyolefin resin (polyolefin resin accounting for 50% by weight or more of total polyolefin resins) is preferably 0.1 g/10 min to 5 g/10 min, and more preferably 0.3 g/10 min to 2 g/10 min, at 230° C. and 2.16 kgf.

The polyolefin resin may also be a composition including polypropylene (so-called general-purpose polypropylene) and polypropylene having melt tension at 200° C. of 5 cN to 50 cN that is greater than the melt tension at 200° C. of the above-mentioned polypropylene (to be referred to as high melt tension polypropylene).

The above-mentioned polypropylene (general-purpose polypropylene) is preferably polypropylene having melt tension at 200° C. of 5 cN or less. An example of high melt tension polypropylene is a modified polypropylene of which melt tension is increased by modifying homopolypropylene.

Foamability of the polyolefin resin is improved when the polyolefin resin includes the high melt tension polypropylene. Namely, a large number of cells are stably formed.

(Thermoplastic Elastomer)

There are no particular limitations on the thermoplastic elastomer according to the present embodiment, and examples thereof include an olefin-based elastomer, a styrene-based thermoplastic elastomer, an urethane-based elastomer, and an ester-based elastomer.

Here, an example of the olefin-based elastomers is ethylene-propylene rubber. Ethylene-propylene rubber includes EPR (EPM) that is a copolymer of ethylene and propylene, which is a rubbery elastic body; and EPDM that is a copolymer of ethylene, propylene and a small amount of a non-conjugated diene (such as ethylidene norbornene, dicyclopentadiene or 1,4-hexadiene). In addition, an olefin-based elastomer may also be used that has been extended with process oil and the like.

Other examples of the olefin-based elastomer include an ethylene-α-olefin copolymer, which is obtained by using a metallocene catalyst, (such as ethylene-1-butene rubber or ethylene-1-octene rubber) of ethylene and α-olefin. Here, examples of the α-olefin include olefins, cyclic olefins, and dienes such as propylene, 1-butene, 1-pentene, 1-hexene, 1-heptene, 1-octene, 1-decene, 4-methyl-1-pentene, cyclopentene, cyclopentadiene, butadiene, 1,5-hexadiene, 1,4-hexadiene or 1,4-pentadiene.

In the foaming step to be subsequently described, although the environment of the resin composition (such as pressure and temperature) changes suddenly, the formation of closed-cells is facilitated by the addition of elastomer to the resin composition. Moreover, flexibility of the resin foam is improved by the addition of elastomer to the resin composition.

In addition, an example of a styrene-based thermoplastic elastomer is a block copolymer in which polystyrene is bound to one or both ends of a polymer composed of a hydrocarbon chain. Examples of such a block copolymer include block copolymers of styrene and butadiene, isoprene, isobutylene or the like, and other examples are obtained by further hydrogenating the block copolymers. Specific examples include styrene-butadiene-styrene block copolymer (SBS) and styrene-ethylene-butylene-styrene block copolymer (SEBS) obtained by hydrogenation of SBS, styrene-isoprene-styrene block copolymer (SIS) and styrene-ethylene-propylene-styrene block copolymer (SEPS) obtained by hydrogenation of SIS, styrene-isoprene-butadiene-isoprene-styrene block copolymer and styrene-ethylene-ethylene-propylene-styrene block copolymer (SEEPS) obtained by hydrogenation thereof, styrene-vinyl isoprene-styrene block copolymer and hydrogenation products thereof, styrene-isobutylene-styrene block copolymer, styrene-butadiene block copolymer and hydrogenation products thereof, and styrene-isobutylene block copolymer and hydrogenation products thereof, and the like, and these may be used alone or two or more types may be used as a mixture. In addition, these may be used after extending with process oil and the like.

(Material that is a Gas at Normal Temperature)

There are no particular limitations on the material that is a gas at normal temperature provided that it is a gas at a normal temperature (normal temperature that is defined in accordance with JIS (Japanese Industrial Standard) Z 8703, specifically a temperature of 5° C. to 35° C.) and a normal pressure (pressure obtained without any specific pressurization and depressurization, and specifically a pressure of 86 kPa to 106 kPa), and the material is preferably an inert gas such as carbon dioxide or nitrogen, and more preferably carbon dioxide which enables the content thereof in polyolefin-based resin to be increased.

(Foam Nucleating Agent)

The resin composition according to the present embodiment preferably includes a foam nucleating agent. Examples of foam nucleating agents that can be used include oxides, compound oxides, metal carbonates, metal sulfates and metal hydroxides such as talc, silica, alumina, mica, titania, zinc oxide, zeolite, calcium carbonate, magnesium carbonate, barium sulfate or aluminum hydroxide. As a result of including these foam nucleating agents, cell diameter can be easily and arbitrarily adjusted, and resin foam can be obtained that has suitable flexibility as well as superior cutting processability.

(Other Components)

Other components (such as other thermoplastic polymers) may be added as production raw materials of the resin composition according to the present embodiment. Furthermore, when producing the resin foam according to the present embodiment, since there is a step of adding a material in a supercritical state to a resin composition and kneading of them in a state in which the resin composition has been melted (high temperature and high pressure), components that crosslink at a high temperature are preferably not included so that the resin composition does not harden and is not prevented from being kneaded thereby. More specifically, a crosslinking agent that is triggered to initiate crosslinking by heat is preferably not added to the raw material composition. However, this does not apply in the case that the crosslinking agent is ensured not to crosslink in the kneading step in which the material in a supercritical state is added to the resin composition in a melted state and they are kneaded (high temperature and high pressure) (such as in the case the crosslinking agent is a component that initiates a crosslinking reaction at a temperature higher than a temperature during that kneading). In this case, a step is included that subjects a sheet foamed by extrusion to conditions at which crosslinking is initiated before hot-pressing, at the same time as hot-pressing, or after hot-pressing (such as a step that subjects the sheet to heat, an electron beam, ultraviolet rays or moisture).

<Incorporated Amounts>

(Incorporated Amount of Thermoplastic Elastomer)

The amount of thermoplastic elastomer incorporated in the resin composition is preferably 5 parts by weight to 35 parts by weight, and more preferably 15 parts by weight to 25 parts by weight, based on 100 parts by weight of the polyolefin resin.

(Incorporated Amount of Material that is a Gas at Normal Temperature)

The incorporated amount of the material that is a gas at normal temperature in the resin composition is preferably 1 part by weight to 10 parts by weight, and more preferably 3 parts by weight to 5 parts by weight, based on 100 parts by weight of the total amount of the resin composition.

(Incorporated Amounts of Other Components)

The incorporated amount of the foam nucleating agent among other components in the resin composition is preferably 1 part by weight to 8 parts by weight, and more preferably 3 parts by weight to 6 parts by weight, based on 100 parts by weight of the total amount of the polyolefin resin. Furthermore, other arbitrary components (such as pigment) may be used as is suitable.

<Process>

As was previously described, the method for producing the resin foam according to the present embodiment includes a melt step, an impregnation step, a foaming step and a compression step. The following provides an explanation of each step in that order.

(Melt Step)

The melt step according to the present embodiment is a step of melting the resin composition including 100 parts by weight of the polyolefin resin and 5 parts by weight to 35 parts by weight of the thermoplastic elastomer. Here, the melt step is carried out under conditions in which both the polyolefin resin and thermoplastic elastomer melt.

In addition, since the material in the supercritical state is added and kneaded following the melt step, the temperature and the pressure in the melt step are preferably such that the material is ensured to be in a supercritical state.

Furthermore, conditions for ensuring that the material is in a supercritical state are subsequently described.

(Impregnation Step)

The impregnation step according to the present embodiment is a step of impregnating the molten resin composition with a material that is a gas at normal temperature and normal pressure, in a supercritical state, under conditions in which the supercritical state of the material is maintained. In such a supercritical state, solubility in the molten resin is increased and the material can be mixed therein at a high concentration. As a result, the formation of cell nuclei increases when pressure drops rapidly since the above-mentioned material is at a high concentration. Moreover, microcells are formed since the material at the molecular level is vaporized. As a result, even if porosity is the same, the density of cells that grow from cell nuclei is greater than that in the case of other states. Furthermore, when carbon dioxide is selected for the material that is a gas at normal temperature and normal pressure, the critical temperature of the carbon dioxide is 31° C., and the critical pressure is 7.4 MPa. Accordingly, when carbon dioxide is selected for the material that is a gas at normal temperature and normal pressure, temperature is preferably within the range of 50° C. to 250° C. and more preferably within the range of 90° C. to 230° C., while pressure is preferably within the range of 8 MPa to 40 MPa and more preferably within the range of 10 MPa to 30 MPa.

(Foaming Step)

The foaming step according to the present embodiment is a step of foaming the resin composition by arranging the resin composition impregnated with the material that is a gas at normal temperature and normal pressure under a condition in which the supercritical state of the material is not maintained. For example, the foaming is carried out by extruding the resin composition impregnated with the material from an extrusion molding machine having a high internal temperature (for example, about 155° C. to 180° C.) and high internal pressure through a mouthpiece (such as continuously extruding thereof into a long sheet (having a thickness of about 1 mm, for example)). Namely, the resin composition is foamed while formed into a sheet shape.

After uniformly dispersing cell nuclei at the molecular level in the above-mentioned resin composition by dissolving the material that is a gas at normal temperature and normal pressure at a high pressure, the resin composition foams internally resulting in the formation of microcells when the pressure is released under normal pressure. Namely, microcells are formed by utilizing the difference in solubility under the pressure of the resin composition. Furthermore, a pressure reduction device is not required in the foaming step since it is only necessary to release the pressure and the pressure applied to the resin composition is lowered to roughly atmospheric pressure simply by extruding the resin composition from an extrusion molding machine.

(Compression Step)

The compression step is a step of obtaining the resin foam by hot-pressing the foamed resin composition. Here, the temperature, pressure (compression ratio) and time in this step are suitably set, taking into account adequately compressing the cells to obtain a microcell structure, crushing the cells uniformly, conversely preventing a reduction in the number of closed-cells due to excessive crushing, and preventing an increase in surface roughness of the sheet surface. For example, the temperature in this step is preferably 80° C. to 130° C. and more preferably 85° C. to 110° C.

The temperature range during the compression step is preferably that which allows plastic deformation of an intermediate molded product (a foamed resin composition prior to the compression step) without allowing recovery of the shape thereof following compression. For example, temperature range during the compression step in the case of using polypropylene for the polyolefin resin is preferably a range (for example, 80° C. to 130° C.) that is 20° C. to 70° C. lower than the melting temperature of polypropylene (for example, about 150° C.). More preferably, the temperature range during the compression step in the case of using polypropylene for the polyolefin resin is a range (for example, 85° C. to 110° C.) that is 40° C. to 65° C. lower than the melting temperature of polypropylene.

When a the polypropylene is composition that includes a principal propylene and a high melt tension polypropylene having a melting temperature lower than that of the principal polypropylene, the temperature range during the compression step is preferably a range that is 20° C. to 70° C. lower than the melting temperature of the principal polypropylene. More preferably, the temperature range during the compression step is a range that is 40° C. to 65° C. lower than the melting temperature of the principal polypropylene.

Moreover, the pressing time in this step is preferably 0.1 second to 5 seconds and more preferably 0.5 seconds to 3 seconds. Here, a known hot press device such as a polishing roller or calender roller including a hot roller can be used for the hot-pressing. The calender roller may be a known calender roller that is typically a machine that rolls a rubber or a resin compound into the shape of a sheet of a certain thickness. Two-roller, three-roller or four-roller machines may be used. The arrangement of rollers may be vertical, in the shape of an inverted L or in the shape of the letter Z. Furthermore, the temperature of the rollers is typically adjusted according to the steam or oil environment.

Here, examples are indicated of sheet thickness before and after compression. First, sheet thickness prior to compression is preferably 0.3 mm to 2.5 mm and more preferably 0.5 mm to 1.0 mm, while that after compression is preferably 0.070 mm to 0.5 mm and more preferably 0.1 mm to 0.2 mm.

In addition, with respect to cell fineness, the number of cells per any 1 mm square in a cross-section taken in the direction perpendicular to the foam sheet prior to compression (cross-section perpendicular to the machine direction, namely cross-section in the TD direction) is preferably 140 to 500 and more preferably 160 to 300. The number of cells per any 100 μm square in a cross-section taken in the direction perpendicular to the foam sheet after compression is preferably 15 to 150 and more preferably 20 to 70. Furthermore, the number of cells as referred to in the claims and description was determined by calculating the number of cells in the most distinct image obtained by taking a photograph of cell diameter by means of the VHX-D510 microscope manufactured by Keyence Corp and adjusting the contrast of images obtained with the same measuring instrument.

<<Resin Foam>>

The resin foam according to the present embodiment (a resin foam obtained according to the previously described production method (and preferably a non-crosslinked resin foam)) is a resin foam including a resin elastomer at a ratio of 5 parts by weight to 35 parts by weight based on 100 parts by weight for the total weight of the polyolefin resin, wherein the number of cells in the foam resin in terms of the number of cells per any 100 μm square in a cross-section taken in the direction perpendicular to the foam sheet (cross-section perpendicular to the machine direction) is preferably within the range of 15 to 150 and more preferably within the range of 20 to 70. The reason why the non-crosslinked resin foam is preferable is that the pores can be uniformly shrunk without being distorted when the non-crosslinked resin foam is compressed with a hot press. In addition, in the case of a crosslinked resin, the cells are not adequately shrunk by hot-pressing if the degree of crosslinking is excessively high. Here, cell diameter has a horizontally long oval shape in the extruded direction or machine direction (MD). Accordingly, the extruded direction is the long diameter while the direction perpendicular to the extruded direction is the short diameter.

Here, the resin foam according to the present invention is typically in the form of a sheet. In this case, the resin foam may be in a form in which the resin film is present alone, or may be in a form in which another layer or base material (such as an adhesive layer) is provided on one side or both sides of the resin foam.

<<Physical Properties of Resin Foam>>

The resin foam according to the present embodiment is a low-thickness with favorable external smoothness and has superior water resistance and dust resistance in the case of being in the form of a sheet, for example.

<<Applications of Resin Foam>>

Since the resin foam (sheet) according to the present embodiment has high levels of water resistance and dust resistance even at a thickness of less than 0.1 mm, it is useful as a waterproof gasket of smartphones and phones having a large display screen. In addition, due to the high levels of water resistance and dust resistance thereof, it is also useful for waterproofing and dust-proofing of precision devices such as watches, digital cameras, digital video cameras, portable music players or televisions.

EXAMPLES

Example 1

(Pellet Production Step)

Five parts by weight of an ethylene-propylene-diene copolymer, as the thermoplastic elastomer, having a weight average molecular weight of 400,000 or more in terms of standard polystyrene that was measured with a high-temperature gel permeation chromatograph using ortho-dichlorobenzene as carrier, an ethylene content of 67% by weight and a diene content of 5% by weight, and 4.1 parts by weight of wet silica as the foam nucleating agent were added to 100 parts by weight of an olefin resin including random polypropylene (principal polypropylene), as the polypropylene, having a melt flow rate (MFR) of 0.5 g/10 min at a temperature of 230° C. and load of 2.16 kg as defined in JIS-K7210, high melt tension random polypropylene, as the polypropylene, having a melt flow rate (MFR) of 2.4 g/10 min at a temperature of 230° C. and load of 2.16 kg as defined in JIS-K7210, and low-density polyethylene (LDPE), as the polyethylene, having a melt flow rate (MFR) of 0.15 g/10 min at a temperature of 190° C. and load of 2.16 kg as defined in JIS-K7210. They were compounded using a twin-screw extruder to obtain pellets. Furthermore, the ratio of the compounded pelletized olefin resins in terms of the weight ratio thereof was such that PP:PE=1:2.1. The melting temperature of the above-mentioned random polypropylene (temperature at which the resin melts) as measured by differential scanning calorimetry (DSC) was 152° C.

(Melt, Kneading and Impregnation Steps)

The resulting pellets were loaded into tandem single-screw extruders, and the pellets were melted and then impregnated with 4 parts by weight of supercritical carbon dioxide based on 100 parts by weight of resin composition in the first extruder and then sent to the second extruder. More specifically, the barrel temperature of the first extruder was set to 180° C., and the compounded materials were kneaded under conditions in which both of the compounded materials melt. The molten resin was impregnated with carbon dioxide in a supercritical state. The temperature of the molten resin at this time was 205° C. As a result of setting the screw rotating speed, namely the feed rate, of the second extruder to be slower than the rotating speed of the first extruder, the pressure inside the extruder rose, and an environment in which the carbon dioxide can be maintained in a supercritical state was created. The resin pressure during the impregnation with carbon dioxide was roughly 15 MPa.

(Foaming Step)

Foam was obtained by releasing pressure on the molten resin composition impregnated with supercritical carbon dioxide all at once from the mouthpiece of the extruder.

(Compression Step)

A 1 mm thick sheet obtained by skiving the surface of the resulting foam and removing the skin layer was compressed by pressing for 1 second using a polishing roller of which temperature was adjusted to 100° C., and low-thickness foams (resin foam) according to Example 1 having foam thickness of 0.1 mm and 0.3 mm were obtained. Similarly, a 0.6 mm thick sheet was compressed by pressing for 1 second using a polishing roller of which temperature was adjusted to 100° C., and low-thickness foams according to Example 1 having foam thickness of 0.1 mm and 0.2 mm were obtained.

Figure 1:
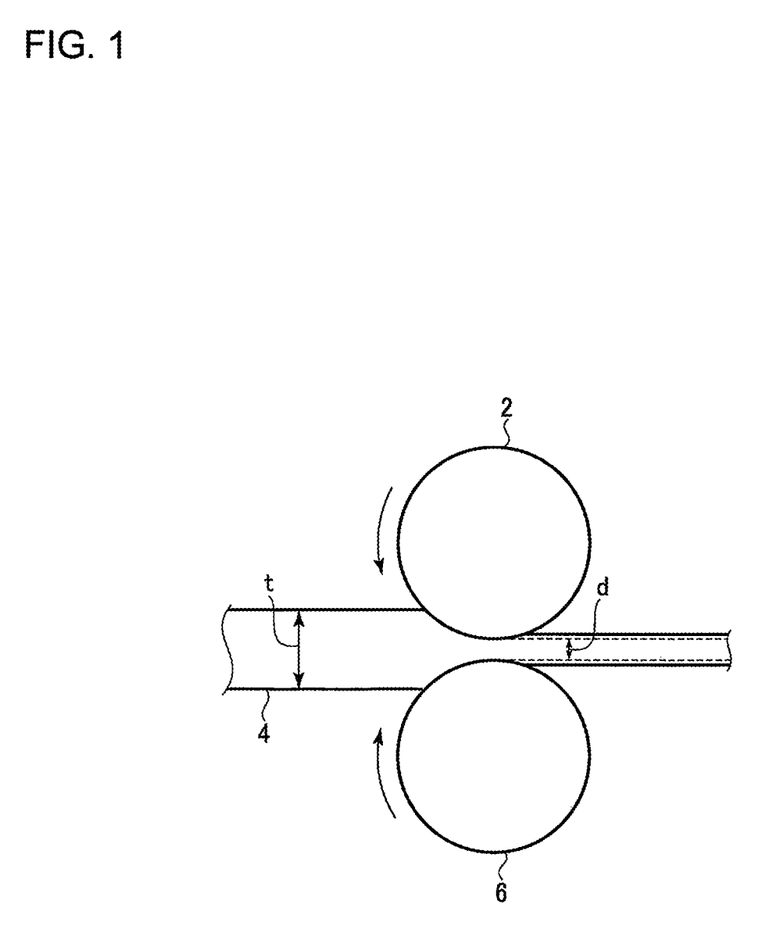
FIG. 1 is a process cross-sectional view for explaining an example of the compression step.

FIG. 1 is a process cross-sectional view for explaining an example of the compression step.

First, a heated first roller 2 and a heated second roller 6, arranged along the first roller 2 such that a distance d from the first roller 2 is shorter than a thickness t of a resin composition 4 (and more specifically, the above-mentioned skived sheet), are rotated. While in this state, the resin composition 4 is fed between the first roller 2 and the second roller 6, and the resin composition 4 is pressed while being heated (hot-pressed). The first roller 2 and the second roller 6 are preferably polishing rollers.

Example 2

Low-thickness foams according to Example 2 were obtained using the same method as Example 1 with the exception of changing the ratios of olefin resin and thermoplastic elastomer in the manner indicated below.

More specifically, 10.3 parts by weight of an ethylene-propylene-diene copolymer, as the thermoplastic elastomer, having a weight average molecular weight of 400,000 or more in terms of standard polystyrene that was measured with a high-temperature gel permeation chromatograph using ortho-dichlorobenzene as carrier, an ethylene content of 67% by weight and a diene content of 5% by weight, and 4.4 parts by weight of wet silica as the foam nucleating agent were added to 100 parts by weight of an olefin resin including random polypropylene (principal polypropylene), as the polypropylene, having a melt flow rate (MFR) of 0.5 g/10 min at a temperature of 230° C. and load of 2.16 kg as defined in JIS-K7210, high melt tension random polypropylene, as the polypropylene, having a melt flow rate (MFR) of 2.4 g/10 min at a temperature of 230° C. and load of 2.16 kg as defined in JIS-K7210, and low-density polyethylene (LDPE), as the polyethylene, having a melt flow rate (MFR) of 0.15 g/10 min at a temperature of 190° C. and load of 2.16 kg as defined in JIS-K7210. They were compounded using a twin-screw extruder to obtain pellets. Furthermore, the ratio of the compounded pelletized olefin resins in terms of the weight ratio thereof was such that PP:PE=1:2.1. The melting temperature of the above-mentioned random polypropylene as measured by differential scanning calorimetry (DSC) was 152° C.

A 1 mm thick sheet obtained by skiving the surface of the resulting foam and removing the skin layer was compressed by pressing for 1 second using a polishing roller of which temperature was adjusted to 100° C., and low-thickness foams according to Example 2 having foam thickness of 0.1 mm and 0.3 mm were obtained. Similarly, a 0.6 mm thick sheet was compressed by pressing for 1 second using a polishing roller of which temperature was adjusted to 100° C., and low-thickness foams according to Example 2 having foam thickness of 0.1 mm and 0.2 mm were obtained.

Example 3

Low-thickness foams according to Example 3 were obtained using the same method as Example 1 with the exception of changing the ratios of olefin resin and thermoplastic elastomer in the manner indicated below.

More specifically, 15.1 parts by weight of an ethylene-propylene-diene copolymer, as the thermoplastic elastomer, having a weight average molecular weight of 400,000 or more in terms of standard polystyrene that was measured with a high-temperature gel permeation chromatograph using ortho-dichlorobenzene as carrier, an ethylene content of 67% by weight and a diene content of 5% by weight, and 4.6 parts by weight of wet silica as the foam nucleating agent were added to 100 parts by weight of an olefin resin including random polypropylene (principal polypropylene), as the polypropylene, having a melt flow rate (MFR) of 0.5 g/10 min at a temperature of 230° C. and load of 2.16 kg as defined in JIS-K7210, high melt tension random polypropylene, as the polypropylene, having a melt flow rate (MFR) of 2.4 g/10 min at a temperature of 230° C. and load of 2.16 kg as defined in JIS-K7210, and low-density polyethylene (LDPE), as the polyethylene, having a melt flow rate (MFR) of 0.15 g/10 min at a temperature of 190° C. and load of 2.16 kg as defined in JIS-K7210. They were compounded using a twin-screw extruder to obtain pellets. Furthermore, the ratio of the compounded pelletized olefin resins in terms of the weight ratio thereof was such that PP:PE=1:2.1. The melting temperature of the above-mentioned random polypropylene as measured by differential scanning calorimetry (DSC) was 152° C.

A 1 mm thick sheet obtained by skiving the surface of the resulting foam and removing the skin layer was compressed by pressing for 1 second using a polishing roller of which temperature was adjusted to 100° C., and low-thickness foams according to Example 3 having foam thickness of 0.1 mm and 0.3 mm were obtained. Similarly, a 0.6 mm thick sheet was compressed by pressing for 1 second using a polishing roller of which temperature was adjusted to 100° C., and low-thickness foams according to Example 3 having foam thickness of 0.1 mm and 0.2 mm were obtained.

Example 4

Low-thickness foams according to Example 4 were obtained using the same method as Example 1 with the exception of changing the ratios of olefin resin and thermoplastic elastomer in the manner indicated below.

More specifically, 21.3 parts by weight of an ethylene-propylene-diene copolymer, as the thermoplastic elastomer, having a weight average molecular weight of 400,000 or more in terms of standard polystyrene that was measured with a high-temperature gel permeation chromatograph using ortho-dichlorobenzene as carrier, an ethylene content of 67% by weight and a diene content of 5% by weight, and 5.0 parts by weight of wet silica as the foam nucleating agent were added to 100 parts by weight of an olefin resin including random polypropylene (principal polypropylene), as the polypropylene, having a melt flow rate (MFR) of 0.5 g/10 min at a temperature of 230° C. and load of 2.16 kg as defined in JIS-K7210, high melt tension random polypropylene, as the polypropylene, having a melt flow rate (MFR) of 2.4 g/10 min at a temperature of 230° C. and load of 2.16 kg as defined in JIS-K7210, and low-density polyethylene (LDPE), as the polyethylene, having a melt flow rate (MFR) of 0.15 g/10 min at a temperature of 190° C. and load of 2.16 kg as defined in JIS-K7210. They were compounded using a twin-screw extruder to obtain pellets. Furthermore, the ratio of the compounded pelletized olefin resins in terms of the weight ratio thereof was such that PP:PE=1:2.1. The melting temperature of the above-mentioned random polypropylene as measured by differential scanning calorimetry (DSC) was 152° C.

A 1 mm thick sheet obtained by skiving the surface of the resulting foam and removing the skin layer, was compressed by pressing for 1 second using a polishing roller of which temperature was adjusted to 100° C., and low-thickness foams according to Example 4 having foam thickness of 0.1 mm and 0.3 mm were obtained. Similarly, a 0.6 mm thick sheet was compressed by pressing for 1 second using a polishing roller of which temperature was adjusted to 100° C., and low-thickness foams according to Example 4 having foam thickness of 0.1 mm and 0.2 mm were obtained.

Example 5

Low-thickness foams according to Example 5 were obtained using the same method as Example 1 with the exception of changing the ratios of olefin resin and thermoplastic elastomer in the manner indicated below.

More specifically, 25.4 parts by weight of an ethylene-propylene-diene copolymer, as the thermoplastic elastomer, having a weight average molecular weight of 400,000 or more in terms of standard polystyrene that was measured with a high-temperature gel permeation chromatograph using ortho-dichlorobenzene as carrier, an ethylene content of 67% by weight and a diene content of 5% by weight, and 5.2 parts by weight of wet silica as the foam nucleating agent were added to 100 parts by weight of an olefin resin including random polypropylene (principal polypropylene), as the polypropylene, having a melt flow rate (MFR) of 0.5 g/10 min at a temperature of 230° C. and load of 2.16 kg as defined in JIS-K7210, high melt tension random polypropylene, as the polypropylene, having a melt flow rate (MFR) of 2.4 g/10 min at a temperature of 230° C. and load of 2.16 kg as defined in JIS-K7210, and low-density polyethylene (LDPE), as the polyethylene, having a melt flow rate (MFR) of 0.15 g/10 min at a temperature of 190° C. and load of 2.16 kg as defined in JIS-K7210. They were compounded using a twin-screw extruder to obtain pellets. Furthermore, the ratio of the compounded pelletized olefin resins in terms of the weight ratio thereof was such that PP:PE=1:2.1. The melting temperature of the above-mentioned random polypropylene as measured by differential scanning calorimetry (DSC) was 152° C.

A 1 mm thick sheet obtained by skiving the surface of the resulting foam and removing the skin layer was compressed by pressing for 1 second using a polishing roller of which temperature was adjusted to 100° C., and low-thickness foams according to Example 5 having foam thickness of 0.1 mm and 0.3 mm were obtained. Similarly, a 0.6 mm thick sheet was compressed by pressing for 1 second using a polishing roller of which temperature was adjusted to 100° C., and low-thickness foams according to Example 5 having foam thickness of 0.1 mm and 0.2 mm were obtained.

Example 6

Low-thickness foams according to Example 6 were obtained using the same method as Example 1 with the exception of changing the ratios of olefin resin and thermoplastic elastomer in the manner indicated below.

More specifically, 34.9 parts by weight of an ethylene-propylene-diene copolymer, as the thermoplastic elastomer, having a weight average molecular weight of 400,000 or more in terms of standard polystyrene that was measured with a high-temperature gel permeation chromatograph using ortho-dichlorobenzene as carrier, an ethylene content of 67% by weight and a diene content of 5% by weight, and 5.7 parts by weight of wet silica as the foam nucleating agent were added to 100 parts by weight of an olefin resin including random polypropylene (principal polypropylene), as the polypropylene, having a melt flow rate (MFR) of 0.5 g/10 min at a temperature of 230° C. and load of 2.16 kg as defined in JIS-K7210, high melt tension random polypropylene, as the polypropylene, having a melt flow rate (MFR) of 2.4 g/10 min at a temperature of 230° C. and load of 2.16 kg as defined in JIS-K7210, and low-density polyethylene (LDPE), as the polyethylene, having a melt flow rate (MFR) of 0.15 g/10 min at a temperature of 190° C. and load of 2.16 kg as defined in JIS-K7210. They were compounded using a twin-screw extruder to obtain pellets. Furthermore, the ratio of the compounded pelletized olefin resins in terms of the weight ratio thereof was such that PP:PE=1:1.9. The melting temperature of the above-mentioned random polypropylene as measured by differential scanning calorimetry (DSC) was 152° C.

A 1 mm thick sheet obtained by skiving the surface of the resulting foam and removing the skin layer was compressed by pressing for 1 second using a polishing roller of which temperature was adjusted to 100° C., and low-thickness foams according to Example 6 having foam thickness of 0.1 mm and 0.3 mm were obtained. Similarly, a 0.6 mm thick sheet was compressed by pressing for 1 second using a polishing roller of which temperature was adjusted to 100° C., and low-thickness foams according to Example 6 having foam thickness of 0.1 mm and 0.2 mm were obtained.

Comparative Example 1

Volara XLIM manufactured by Sekisui Chemical Co., Ltd. (thickness: 0.1 mm, crosslinked polyethylene foam produced by chemical foaming) was evaluated as a comparative example.

Comparative Example 2

Volara XLIM manufactured by Sekisui Chemical Co., Ltd. (thickness: 0.3 mm, crosslinked polyethylene foam produced by chemical foaming) was evaluated as a comparative example.

Comparative Example 3

Low-thickness foams according to Comparative Example 3 were obtained using the same method as Example 1 with the exception of changing the ratios of olefin resin and thermoplastic elastomer in the manner indicated below.

3.8 parts by weight of wet silica as a foam nucleating agent were added to 100 parts by weight of an olefin resin including:

1) random polypropylene (principal polypropylene), as the polypropylene, having a melt flow rate (MFR) of 0.5 g/10 min at a temperature of 230° C. and load of 2.16 kg as defined in JIS-K7210, and 2) high melt tension random polypropylene having a melt flow rate (MFR) of 2.4 g/10 min at a temperature of 230° C. and load of 2.16 kg as defined in JIS-K7210, and 3) low-density polyethylene (LDPE), as the polyethylene, having a melt flow rate (MFR) of 0.15 g/10 min at a temperature of 190° C. and load of 2.16 kg as defined in JIS-K7210.

They were compounded using a twin-screw extruder to obtain pellets (namely, thermoplastic elastomer was not added). Furthermore, the ratio of the compounded pelletized olefin resins in terms of the weight ratio thereof was such that PP:PE=1:3.2. The melting temperature of the above-mentioned random polypropylene as measured by differential scanning calorimetry (DSC) was 152° C.

In other words, the resin composition of Comparative Example 3 does not include a thermoplastic elastomer.

A 1 mm thick sheet obtained by skiving the surface of the resulting foam and removing the skin layer was compressed by pressing for 1 second using a polishing roller of which temperature was adjusted to 100° C., and low-thickness foams according to Comparative Example 3 having foam thickness of 0.1 mm and 0.3 mm were obtained. Similarly, a 0.6 mm thick sheet was compressed by pressing for 1 second using a polishing roller of which temperature was adjusted to 100° C., and low-thickness foams according to Comparative Example 3 having foam thickness of 0.1 mm and 0.2 mm were obtained.

<<Evaluation Tests>>

The following evaluation tests were carried out on the low-thickness foams according to Examples 1 to 6 and Comparative Examples 1 to 3.

(Evaluation of Water Resistance)

Non-carrier adhesive tapes manufactured by Sony Chemical & Information Device Corp. (trade name: NP203 (adhesive thickness: 50 μm)) were pressed onto both sides of the resulting low-thickness foams by passing a 2 kg roller back and forth over the tapes. Doughnut-like foams having an outer diameter of 36 mm and inner diameter of 34 mm were stamped out to obtain test pieces. The seal widths of the test pieces were 1 mm. The test pieces stamped out into the shape of a doughnut having a seal width of 1 mm were sandwiched between two acrylic plates having a thickness of 5 mm and adhered and affixed thereto. Water was filled to a depth of 100 cm in a water tank having a height of 150 cm fabricated by sealing one end of a polyvinyl chloride pipe having an inner diameter of 100 mm, and the test pieces affixed to the two acrylic plates were submerged by slowly therein and allowed to stand undisturbed for 30 minutes. After 30 minutes, the test pieces affixed to the two acrylic plates were removed and leakages of water into the doughnut-shaped inner portions were evaluated visually, and the test pieces without water leakage were judged as O while the test pieces with water leakage were judged as x. Similarly, evaluations were carried out on test pieces having a seal width of 0.75 mm stamped out into the shape of a doughnut having an outer diameter of 36 mm and inner diameter of 34.5 mm, and the test pieces without water leakage were judged visually as O (the absence of water leakage) and the test pieces with water leakage as x (the presence of water leakage). The number of tests n was set to 5, and the test pieces were judged as x when water leakage was observed in even one of the test pieces.

(Evaluation of Dust Resistance)

Non-carrier adhesive tapes manufactured by Sony Chemical & Information Device Corp. (trade name: NP203 (adhesive thickness: 50 μm)) were pressed onto both sides of the resulting low-thickness foams by passing a 2 kg roller back and forth over the tapes. Doughnut-like foams having an outer diameter of 36 mm and inner diameter of 34 mm were stamped out to obtain test pieces. The seal widths of the test pieces were 1 mm. The test pieces stamped out into the shape of a doughnut having a seal width of 1 mm were sandwiched between two acrylic plates having a thickness of 5 mm and adhered and affixed thereto. A test set including 150 g of talc powder having an average particle diameter of 5 μm and the test pieces affixed to the two acrylic plates was placed in a container that was made of a wide-mouth container (such as that available from AS ONE Corporation) made of high-density polyethylene and having a mouth diameter of 74 mm, body diameter of 174.5 mm, and volume of 5 L, and was equipped with a single horizontal baffle plate for the purpose of stirring at 40 mm-high point in the body. Thereafter, the container was sealed. After placing the initially upright container on its side, the container was rotated for 1 hour at a speed of 34 to 39 revolutions per minute in the circumferential direction. Although there are no particular limitations on the rotating device, a mix rotor was used in the present testing. One hour later, the test pieces affixed to the two acrylic plates were removed and penetration of talc powder into the doughnut-shaped inner portions was evaluated visually, and the test pieces that talc powder did not penetrate into and satisfied dust resistance were judged as O while the test pieces that talc powder penetrated into and did not satisfy dust resistance were judged as x. Similarly, evaluations were carried out on test pieces having a seal width of 0.75 mm stamped out into the shape of a doughnut having an outer diameter of 36 mm and inner diameter of 34.5 mm, and penetration of talc powder into the doughnut-shaped inner portions was judged visually. The test pieces that talc powder did not penetrate into and satisfied dust resistance were judged as O (absence of dust contamination) while the test pieces which talc powder penetrated into and did not satisfy dust resistance were judged as x (presence of dust contamination). The number of tests n was set to 5, and the test pieces were evaluated as x when dust penetration was observed in even one of the test pieces.

(Measurement of Melting Temperature)

Melting temperatures were measured based on Testing Methods for Transition Temperatures of Plastics described in JIS-K7121. More specifically, the endothermic peak measured when heating from the temperature in the standard state to 200° C. at a heating rate of 10° C./min by differential scanning calorimetry (DSC) was taken to be the melting temperature.

Figure 2:
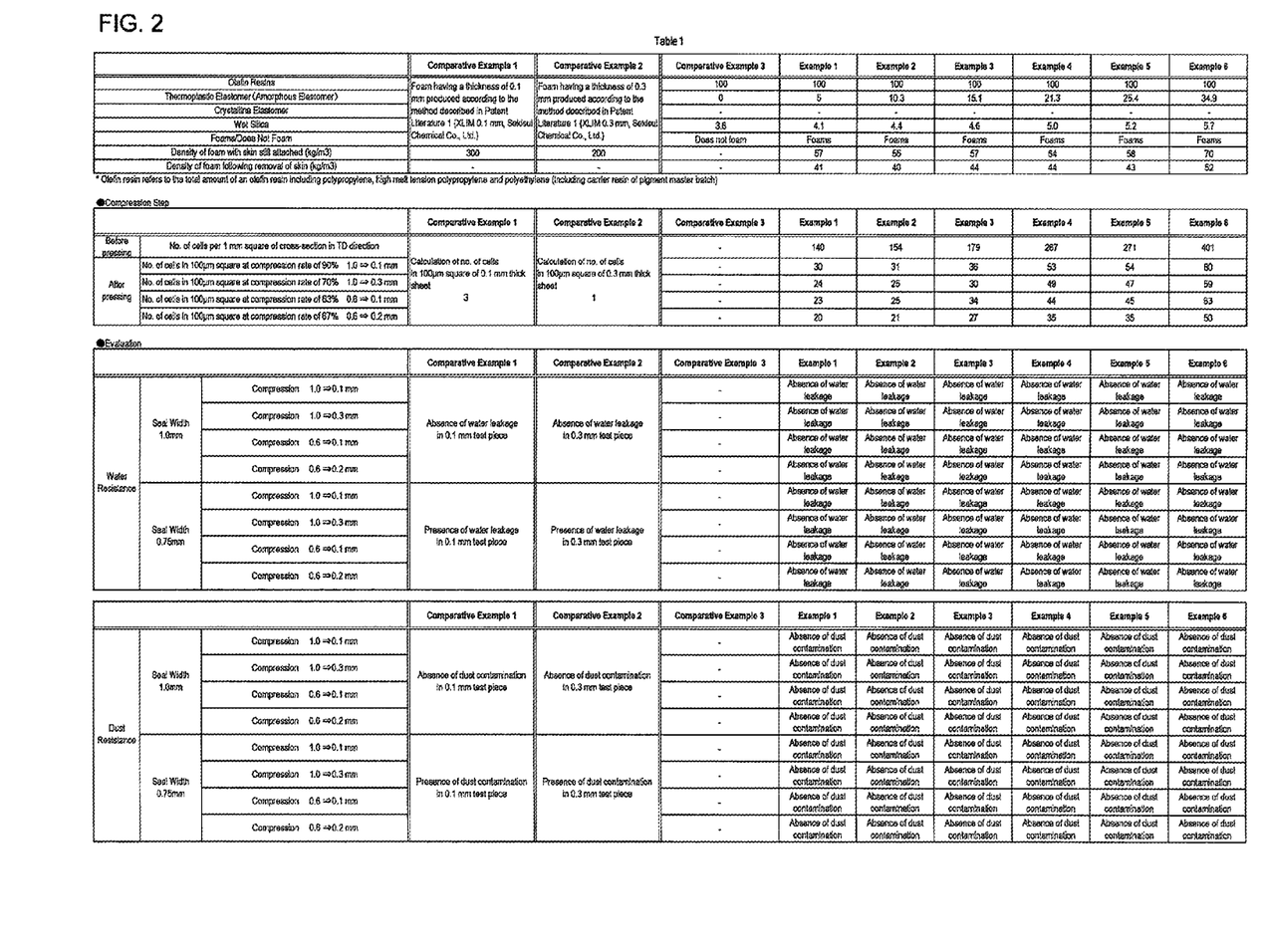
FIG. 2 is a table showing the results of evaluating low-thickness foams of Examples 1 to 6 and Comparative Examples 1 to 3.

FIG. 2 is a table showing the results of evaluating the low-thickness foams of Examples 1 to 6 and Comparative Examples 1 to 3. As shown in FIG. 2, according to Embodiment 1, resin foam sheets that ensure high dust resistance and water resistance are provided.

(Embodiment 2)

The production method of Embodiment 2 is similar to the production method of Embodiment 1. Thus, explanations of those aspects that are in common with Embodiment 1 are omitted or simplified.

The polyolefin resins of Examples 1 to 6 according to Embodiment 1 includes a composition of random polypropylene (principal polypropylene), high melt tension random polypropylene and low-density polyethylene. On the other hand, the polyolefin resins of Embodiment 2 contain homopolypropylene.

EXAMPLES

Example 7

Pellet Production Step 29 parts by weight of an ethylene-propylene-diene copolymer, as the thermoplastic elastomer, having a weight average molecular weight of 400,000 or more in terms of standard polystyrene that was measured with a high-temperature gel permeation chromatograph using ortho-dichlorobenzene as carrier, an ethylene content of 67% by weight and a diene content of 5% by weight, and 4.9 parts by weight of wet silica as the foam nucleating agent, were added to 100 parts by weight of an olefin resin including homopolypropylene (principal polypropylene) having a melt flow rate (MFR) of 0.5 g/10 min at a temperature of 230° C. and load of 2.16 kg as defined in JIS-K7210, and high melt tension homopolypropylene having a melt flow rate (MFR) of 2.4 g/10 min at a temperature of 230° C. and load of 2.16 kg as defined in JIS-K7210. They were compounded using a twin-screw extruder to obtain pellets. The melting temperature of the above-mentioned homopolypropylene as measured by differential scanning calorimetry (DSC) was 172° C.

(Melt, Kneading and Impregnation Steps)

The resulting pellets were loaded into tandem single-screw extruders, and the pellets were melted and then impregnated with 4 parts by weight of supercritical carbon dioxide based on 100 parts by weight of resin composition in the first extruder and then sent to the second extruder. More specifically, the barrel temperature of the first extruder was set to 180° C., and the compounded materials were kneaded under conditions in which either of the compounded materials melted. The molten resin was impregnated with carbon dioxide in a supercritical state. The temperature of the molten resin at this time was 205° C. As a result of setting the screw rotating speed, namely the feed rate, of the second extruder to be slower than the rotating speed of the first extruder, the pressure inside the extruder rose, and an environment in which the carbon dioxide can be maintained in a supercritical state was created. The resin pressure during the impregnation with carbon dioxide was roughly 20 MPa.

(Foaming Step)

Foam was obtained by releasing pressure on the molten resin composition impregnated with supercritical carbon dioxide all at once from the mouthpiece of the extruder.

(Compression Step)

A 1 mm thick sheet obtained by skiving the surface of the resulting foam and removing the skin layer was compressed by pressing for 1 second using a polishing roller of which temperature was adjusted to 130° C., and low-thickness foams according to Example 7 having foam thickness of 0.1 mm and 0.3 mm were obtained. Furthermore, the compression temperature, which was the temperature of the polishing roller, was 42° C. lower than the melting temperature of the principal polypropylene. Similarly, a 0.6 mm thick sheet was compressed by pressing for 1 second using a polishing roller of which temperature was adjusted to 130° C., and low-thickness foams according to Example 7 having foam thickness of 0.1 mm and 0.2 mm were obtained.

FIG. 3 is a table showing the results of evaluating the low-thickness foams according to Example 7. The evaluation methods were the same as those used in Embodiment 1. The results of evaluating low-thickness foams according to Examples 8 and 9 to be subsequently described are also shown in FIG. 3.

As shown in FIG. 3, according to Embodiment 2, resin foam sheets that ensure high dust resistance and water resistance are provided similarly to Embodiment 1.

(Embodiment 3)

The resin foam of Embodiment 3 and the production method thereof are similar to the resin foam of Embodiment 2 and the production method thereof. Thus, explanations of those aspects that are in common with Embodiment 2 are omitted or simplified.

<<Method for Producing Resin Foam>>

The resin foams of Embodiment 2 were produced from a composition including polyolefin resin and thermoplastic elastomer. On the other hand, the resin foams of Embodiment 3 were produced from a resin composition including a polyolefin resin, a thermoplastic elastomer (to be referred to as amorphous elastomer), and an elastomer having a higher degree of crystallization than this amorphous elastomer (to be referred to as crystalline elastomer). The crystalline elastomer is preferably thermoplastic.

The melt step of Embodiment 3 is carried out under conditions in which the polyolefin resin, amorphous elastomer and crystalline elastomer melt.

When the temperature decreases, the viscosity of the molten crystalline elastomer increases suddenly within a narrow temperature range (to be referred to as the transition temperature range) that includes the crystallization temperature thereof (temperature at which the molten resin solidifies). As a result of this sudden increase in viscosity, the viscosity of the crystalline elastomer becomes higher than the viscosity of the amorphous elastomer. On the other hand, on the high side of the transition temperature range, the viscosity of the crystalline elastomer is lower than the viscosity of the amorphous elastomer.

When the molten resin composition is extruded from an extruding machine, inert gas impregnated into the resin composition vaporizes and generates cells. If the viscosity of the resin composition is low, the generated cells end up escaping from the resin composition without being retained in the resin composition.

In Embodiment 3, however, when the temperature of the molten resin composition decreases to the vicinity of the crystallization temperature of the crystalline elastomer, the viscosity of the crystalline elastomer increases suddenly and cells are inhibited from escaping from the resin composition. As a result, the number of cells included in the resin foam increases.

The amorphous elastomer of Embodiment 3 is, for example, an ethylene-propylene rubber or ethylene-α-olefin copolymer. The amorphous elastomer may be extended with process oil and the like.

The crystalline elastomer of Embodiment 3 is, for example, a block copolymer of an ethylene-α-olefin copolymer and linear low-density polyethylene (LLDPE) (to be referred to as olefin block copolymer). The ethylene-α-olefin copolymer was previously described in detail in Embodiment 1. The crystalline elastomer may also be extended with process oil and the like.

Figure 4:
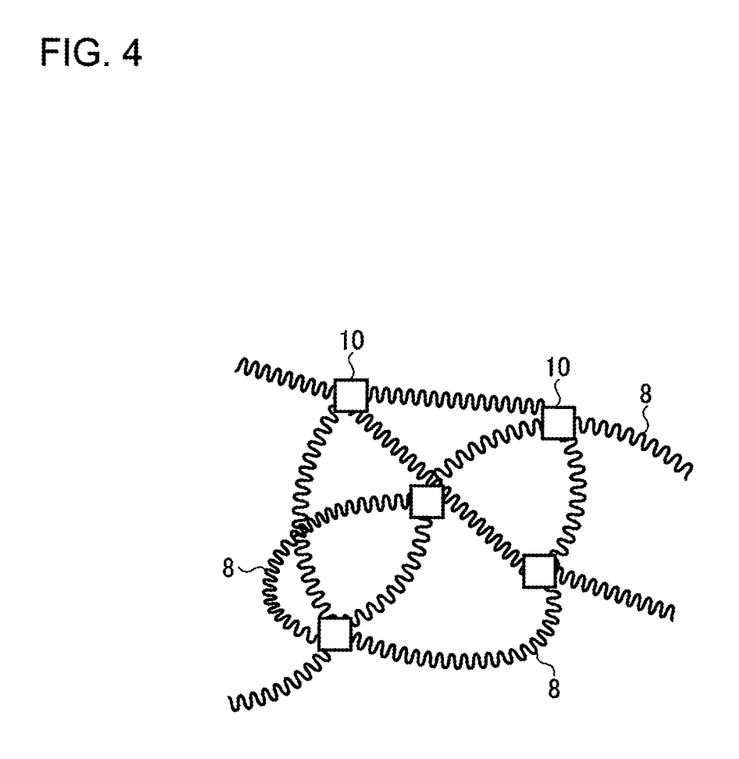
FIG. 4 is a drawing for explaining one example of the structure of an olefin block copolymer.

FIG. 4 is a drawing for explaining one example of the structure of an olefin block copolymer.

The ethylene-α-olefin copolymer is a soft, amorphous resin. On the other hand, linear low-density polyethylene (LLDPE) is a highly crystalline resin.

The olefin block copolymer is a polymer having soft segments 8 obtained by continuously linking ethylene-α-olefin copolymers and hard segments 10 obtained by continuously linking linear low-density polyethylene.

The olefin block copolymer has rubbery elasticity due to the flexibility of the ethylene-α-olefin copolymer that forms the soft segments 8, and is partially crystallized due to the crystallinity of the linear low-density polyethylene that forms the hard segments 10. The olefin block copolymer is partially crystallized as a result of cross linking of the hard segments.

When the molten resin composition is cooled to the vicinity of the crystallization temperature of the olefin block copolymer, the viscosity of the olefin block copolymer increases suddenly, and as a result thereof, cell retention of the resin composition increases. As a result, the number of cells of the resin foam (foamed resin composition) increases.

By the way, the time during which the crystalline elastomer is cooled to the vicinity of the crystallization temperature after the resin composition is extruded from the extruding machine becomes shorter the higher the crystallization temperature of the crystalline elastomer. Thus, as the crystallization temperature of the crystalline elastomer becomes higher, the time during which cells escape from the low-viscosity resin composition becomes shorter, and the number of cells of the resin foam increases.

The crystallization temperature of the crystalline elastomer (such as an olefin block copolymer) of Embodiment 3 is, for example, a high temperature of 90° C. or higher. Thus, according to Embodiment 3, the number of cells included in the resin foam is greater than that of Embodiments 1 and 2. By the way, the crystallization temperature of the crystalline elastomer is preferably lower than the temperature immediately prior to the resin composition being extruded from the extruding machine. Thus, the crystallization temperature of the crystalline elastomer is preferably, for example, 90° C. to 150° C.

The resin composition of Embodiment 3 preferably includes 100 parts by weight of polyolefin resin, 5 parts by weight to 55 parts by weight of amorphous elastomer (thermoplastic elastomer), and 25 parts by weight to 75 parts by weight of crystalline elastomer.

Furthermore, among other components present in the resin composition, the incorporated amount of foam nucleating agent is preferably 1 part by weight to 10 parts by weight, and more preferably 3 parts by weight to 8 parts by weight, based on 100 parts by weight of the total amount of the polyolefin resin. Furthermore, other arbitrary components (such as pigment) may be used as is suitable.

<<Resin Foam>>

The resin foam of Embodiment 3 (the resin foam including closed-cells) includes a thermoplastic polyolefin resin (excluding elastomers), a thermoplastic elastomer, and a crystalline elastomer having a degree of crystallization higher than that of this thermoplastic elastomer.

The above-mentioned thermoplastic elastomer is, for example, ethylene-propylene rubber or ethylene-α-olefin copolymer. The above-mentioned crystalline elastomer is, for example, a block copolymer of an ethylene-α-olefin copolymer and polyethylene. The crystallization temperature of the above-mentioned crystalline elastomer is preferably 90° C. to 150° C.

The incorporated amount of the above-mentioned polyolefin resin is preferably 100 parts by weight. The incorporated amount of the above-mentioned thermoplastic elastomer is preferably 5 parts by weight to 55 parts by weight. The incorporated amount of the above-mentioned crystalline elastomer is preferably 25 parts by weight to 75 parts by weight.

With respect to cell fineness, the number of cells per any 1 mm square in a cross-section perpendicular to the machine direction (cross-section in the TD direction) of the foam sheet prior to compression is preferably 300 to 400 and more preferably 320 to 380. The number of cells per any 100 µm square in a cross-section perpendicular to the machine direction of the foam sheet after compression is preferably 30 to 80 and more preferably 40 to 70.

Example 8

Low-thickness foams according to Example 8 were obtained using the same method as Example 7 with the exception of changing the ratios of olefin resin and thermoplastic elastomer (amorphous elastomer) and adding crystalline elastomer to the resin composition along with amorphous elastomer.

More specifically, 37 parts by weight of an ethylene-propylene-diene copolymer (amorphous elastomer) having a weight average molecular weight of 400,000 or more in terms of standard polystyrene that was measured with a high-temperature gel permeation chromatograph using ortho-dichlorobenzene as carrier, an ethylene content of 67% by weight and a diene content of 5% by weight, 26 parts by weight of an olefin block copolymer having a melt flow rate (MFR) of 0.5 g/10 min at a temperature of 190° C. and load of 2.16 kg as defined in JIS-K6922-2 and comprising linear low-density polyethylene as hard segments and ethylene-1-octene copolymer (ethylene-α-olefin copolymer) as soft segments, and 6.1 parts by weight of wet silica as the foam nucleating agent were added to 100 parts by weight of an olefin resin including homopolypropylene (principal polypropylene) having a melt flow rate (MFR) of 0.5 g/10 min at a temperature of 230° C. and load of 2.16 kg as defined in JIS-K7210, and high melt tension homopolypropylene having a melt flow rate (MFR) of 2.4 g/10 min at a temperature of 230° C. and load of 2.16 kg as defined in JIS-K7210. They were compounded using a twin-screw extruder to obtain pellets.

The melting temperature of the homopolypropylene (principal polypropylene) was 172° C. The melting temperature and crystallization temperature of the olefin block copolymer are 119° C. and 93° C., respectively. The melting temperature and crystallization temperature were measured by differential scanning calorimetry (DSC).

The above-mentioned olefin block copolymer is, for example, a polymeric material sold by Dow Chemical Company under the trade name "Infuse™".

The resin composition of Example 8 is a composition in which a block copolymer (crystalline elastomer) having linear low-density polyethylene as hard segments and ethylene-1-octene copolymer as soft segments is added into a polyolefin matrix in addition to an ethylene-propylene-diene copolymer (amorphous elastomer).

When the resin composition is extruded from an extruding machine, cells are formed and the viscosity of the olefin block copolymer (crystalline elastomer) increases suddenly, thereby the escape of cells from the resin composition is inhibited. Consequently, a large number of closed-microcells are formed.

A 1 mm thick sheet obtained by skiving the surface of the resulting foam and removing the skin layer was compressed by pressing for 1 second using a polishing roller of which temperature was adjusted to 130° C., and low-thickness foams according to Example 8 having foam thickness of 0.1 mm and 0.3 mm were obtained. Similarly, a 0.6 mm thick sheet was compressed by pressing for 1 second using a polishing roller of which temperature was adjusted to 130° C., and low-thickness foams according to Example 8 having foam thickness of 0.1 mm and 0.2 mm were obtained.

Example 9

Low-thickness foams according to Example 9 were obtained using the same method as Example 7 with the exception of changing the ratios of olefin resin and thermoplastic elastomer (amorphous elastomer) and adding crystalline elastomer to the resin composition along with amorphous elastomer.

More specifically, 50 parts by weight of an ethylene-propylene-diene copolymer (amorphous elastomer) having a weight average molecular weight of 400,000 or more in terms of standard polystyrene, which was measured with a high-temperature gel permeation chromatograph using ortho-dichlorobenzene as carrier, an ethylene content of 67% by weight and a diene content of 5% by weight, 71 parts by weight of an olefin block copolymer (crystalline elastomer) having a melt flow rate (MFR) of 0.5 g/10 min at a temperature of 190° C. and load of 2.16 kg as defined in JIS-K6922-2 and comprising linear low-density polyethylene as hard segments and ethylene-1-octene copolymer (ethylene-α-olefin copolymer) as soft segments, and 8.3 parts by weight of wet silica as the foam nucleating agent, were added to 100 parts by weight of an olefin resin including homopolypropylene (principal polypropylene) having a melt flow rate (MFR) of 0.5 g/10 min at a temperature of 230° C. and load of 2.16 kg as defined in JIS-K7210, and high melt tension homopolypropylene having a melt flow rate (MFR) of 2.4 g/10 min at a temperature of 230° C. and load of 2.16 kg as defined in JIS-K7210. They were compounded using a twin-screw extruder to obtain pellets.

The melting temperature of the above-mentioned homopolypropylene (principal polypropylene) was 172° C. The melting temperature of the above-mentioned olefin block copolymer is 119° C. The crystallization temperature of the above-mentioned olefin block copolymer is 93° C. The melting temperature and crystallization temperature were measured by differential scanning calorimetry (DSC).

The above-mentioned olefin block copolymer is, for example, a polymeric material sold by Dow Chemical Company under the trade name "Infuse™".

The resin composition of Example 9 is a composition in which a block copolymer (crystalline elastomer) having linear low-density polyethylene as hard segments and ethylene-1-octene copolymer as soft segments is added into a polyolefin matrix (such as a homopolypropylene matrix) in addition to an ethylene-propylene-diene copolymer (amorphous elastomer).

When the resin composition is extruded from an extruding machine, cells are formed and the viscosity of the block copolymer (crystalline elastomer) increases suddenly, thereby the escape of cells from the resin composition is inhibited. Consequently, a large number of closed-microcells are formed.

A 1 mm thick sheet obtained by skiving the surface of the resulting foam and removing the skin layer was compressed by pressing for 1 second using a polishing roller of which temperature was adjusted to 130° C., and low-thickness foams according to Example 9 having foam thickness of 0.1 mm and 0.3 mm were obtained. Similarly, a 0.6 mm thick sheet was compressed by pressing for 1 second using a polishing roller of which temperature was adjusted to 130° C., and obtain low-thickness foams according to Example 9 having foam thickness of 0.1 mm and 0.2 mm were obtained.

The low-thickness foams according to Examples 8 and 9 were evaluated using the methods indicated in Embodiment 1. The evaluation results are shown in FIG. 3.

As shown in FIG. 3, according to Examples 8 and 9, resin foam sheets that ensure high dust resistance and water resistance are provided in the same manner as Examples 1 to 7.

As shown in FIG. 3, the densities of the low-thickness foams of Examples 8 and 9 is 57 kg/cm$^3$ to 60 kg/cm$^3$. Low-thickness foams that had densities (57 kg/cm$^3$ to 60 kg/cm$^3$) roughly equal to those of the low-thickness foams of Examples 8 to 9 among the low-thickness foams of Examples 1 to 7 not including crystalline elastomer are the low-thickness foams of Examples 5 and 7.

As is clear from a comparison of the number of cells between Examples 8 and 9 and Examples 5 and 7, the number of cells of low-thickness foams including crystalline elastomer is greater than the number of cells of the low-thickness foams of Examples 5 and 7 not including crystalline elastomer while including roughly the same density (weight density).

In the case the density of low-thickness foams is constant, the size of individual cells decreases as the number of cells increases. The water resistance and dust resistance of a low-thickness foam improve as cell size decreases. Thus, according to Embodiment 3, the water resistance and dust resistance of the resulting low-thickness foam improves more than in Embodiments 1 and 2.

By the way, the incorporated amount of amorphous elastomer in Examples 8 and 9 is 35 parts by weight to 55 parts by weight based on 100 parts by weight of polyolefin resin. However, even in the case the incorporated amount of amorphous elastomer is 35 parts by weight to 55 parts by weight, the number of cells of the resin foam increases and water resistance and dust resistance improve.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for producing non-crosslinked resin foam, the method comprising:
   melting a resin composition including 100 parts by weight of a thermoplastic polyolefin resin other than an elastomer wherein the thermoplastic polyolefin resin includes a high melt tension random polypropylene having a first melt tension of 5 cN to 50 cN at 200° C., 35 parts by weight to 55 parts by weight of an amorphous thermoplastic elastomer, and a crystalline elastomer having a higher degree of crystallization than the amorphous thermoplastic elastomer,
   wherein the crystalline elastomer is a block copolymer of an linear low-density polyethylene and an ethylene-α-olefin copolymer other than an linear low-density polyethylene, and having a crystallization temperature of 90° C. or higher, wherein the amorphous thermoplastic elastomer is an ethylene-propylene rubber or an ethylene-α-olefin copolymer; impregnating the resin composition with a material, wherein the material is in supercritical state;
   foaming the resin composition impregnated with the material by arranging the resin composition under a condition in which the supercritical state of the material is not maintained; and
   hot-pressing the foamed resin composition.

2. The method for producing non-crosslinked resin foam according to claim 1, wherein the foaming is foaming the resin composition while molding the resin composition into a form of a sheet.

3. The method for producing non-crosslinked resin foam according to claim 1, wherein the thermoplastic polyolefin resin further includes a second polypropylene having a second melt tension at 200° C., wherein the first melt tension is greater than the second melt tension.

4. The method for producing non-crosslinked resin foam according to claim 1, wherein the resin composition includes 25 parts by weight to 75 parts by weight of the crystalline elastomer.

5. The method for producing non-crosslinked resin foam according to claim 1, wherein the foaming is extruding the resin composition impregnated with the material that is arranged in an extruding machine under a condition in which the supercritical state of the material is maintained, from the extruding machine through a mouthpiece.

6. The method for producing non-crosslinked resin foam according to claim 1, wherein a number of cells in a 100 μm square in a cross-section perpendicular to a machine direction of the resin foam is 20 or more.

7. The method for producing non-crosslinked foam resin according to claim 1, wherein the hot-pressing is hot-pressing the resin composition by supplying the resin composition between a first roller and a second roller, while rotating the first roller and the second roller arranged along the first roller so that a distance from the first roller is shorter than a thickness of the resin composition.

8. A non-crosslinked resin foam having closed-cells, comprising a resin composition comprising:
   100 parts by weight of a thermoplastic polyolefin resin other than an elastomer;
   35 parts by weight to 55 parts by weight of an amorphous thermoplastic elastomer; and
   a crystalline elastomer having a degree of crystallization higher than that of the amorphous thermoplastic elastomer,
   wherein the thermoplastic polyolefin resin includes a high melt tension random polypropylene having a first melt tension of 5 cN to 50 cN at 200° C.,
   wherein the crystalline elastomer is a block copolymer of an linear low-density polyethylene and an ethylene-α-olefin copolymer other than an linear low-density polyethylene, and having a crystallization temperature of 90° C. or higher, wherein the amorphous thermoplastic elastomer is an ethylene-propylene rubber or an ethylene-α-olefin copolymer, and wherein the non-crosslinked resin foam is formed by extrusion foaming while impregnating with a material that is a gas at normal temperature and normal pressure by arranging the resin composition under a condition in which the supercritical state of the material is not maintained.

9. The non-crosslinked resin foam according to claim 8, wherein an amount of the crystalline elastomer is 25 parts by weight to 75 parts by weight.

10. The non-crosslinked resin foam according to claim 8, wherein a number of cells in a 100 μm square in a cross-section perpendicular to a machine direction is 35 or more.

11. The method for producing non-crosslinked resin foam according to claim 7, wherein the first roller and the second roller are heated.

12. The non-crosslinked resin foam according to claim 8, wherein the non-crosslinked resin foam does not comprise a chemical foaming agent.

13. A method for producing the non-crosslinked resin foam according to claim 8, the method comprising:

melting the resin composition including the thermoplastic polyolefin resin other than an elastomer the crystalline elastomer having a higher degree of crystallization than the amorphous thermoplastic elastomer and the amorphous thermoplastic elastomer; impregnating the resin composition with a material, wherein the material is in the supercritical state;

foaming the resin composition impregnated with the material that is a gas at normal temperature and normal pressure by arranging the resin composition under a condition in which the supercritical state of the material is not maintained; and hot-pressing the foamed resin composition.

14. The method for producing non-crosslinked resin foam according to claim 13, wherein the material is an inert gas.

15. The method for producing non-crosslinked resin foam according to claim 13, wherein the material is carbon dioxide.

16. The method for producing non-crosslinked resin foam according to claim 13, wherein the method is performed without a chemical foaming agent.

17. The non-crosslinked resin foam according to claim 8, wherein the thermoplastic polyolefin resin further includes a second polypropylene having a second melt tension at 200° C., the first melt tension being greater than the second melt tension.

18. A non-crosslinked resin foam having closed-cells, comprising:

a thermoplastic polyolefin resin other than an elastomer;
a thermoplastic elastomer; and
a crystalline elastomer having a degree of crystallization higher than that of the thermoplastic elastomer, wherein the thermoplastic polyolefin resin includes a high melt tension random polypropylene; and wherein the crystalline elastomer is a block copolymer of an ethylene-α-olefin copolymer and an linear low-density polyethylene, the ethylene-α-olefin copolymer not being an linear low-density polyethylene.

19. The non-crosslinked resin foam according to claim 18, wherein the crystalline elastomer includes a plurality of first blocks of the ethylene-α-olefin copolymer and a plurality of second blocks of the linear low-density polyethylene, each of the first blocks are bounded to at least two of the second blocks, each of the second blocks includes one end that is bounded to one of the first blocks and another end that is bounded to another block of the first blocks.

20. The non-crosslinked resin foam according to claim 18, wherein the ethylene-α-olefin copolymer is ethylene-1-octene copolymer.

* * * * *